Dec. 15, 1925.  
F. W. IVES  
ACCELERATOR PEDAL  
Filed Sept. 1, 1925  
1,566,094

F. W. Ives, INVENTOR.

BY

Geo. F. Kimmel ATTORNEY.

Patented Dec. 15, 1925.

1,566,094

UNITED STATES PATENT OFFICE.

FREDERICK W. IVES, OF NORTH TONAWANDA, NEW YORK.

ACCELERATOR PEDAL.

Application filed September 1, 1925. Serial No. 53,932.

*To all whom it may concern:*

Be it known that I, FREDERICK W. IVES, a citizen of the United States, residing at North Tonawanda, in the county of Niagara and State of New York, have invented certain new and useful Improvements in Accelerator Pedals, of which the following is a specification.

This invention relates to automobile attachments and pertains particularly to an accelerator pedal.

A primary object of this invention is the provision, in a manner as hereinafter set forth, of a pivotally mounted accelerator pedal having associated therewith a resilient arcuate member intended to bear upon and slidably contact with the head of an accelerator push rod.

Another object of the invention is the provision, in a manner as hereinafter set forth, of an accelerator pedal having pivotal supporting means which may be adjusted to raise or lower the pedal or to move the same forwardly or rearwardly, for the proper positioning of the pedal with respect to the accelerator rod upon which it is to rest.

A further and final object of the invention is the provision, in a manner as hereinafter set forth, of an accelerator pedal of simple construction, strong and durable, and designed to enable one to maintain a constant and steady pressure upon the accelerator rod with which the pedal contacts.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
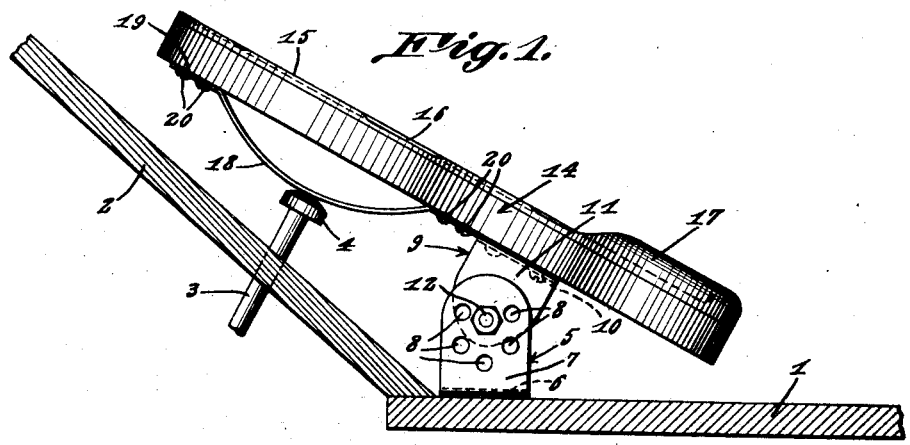
Figure 1 shows the device embodying this invention, in side elevation and as mounted upon an automobile floor board.
Figure 2:
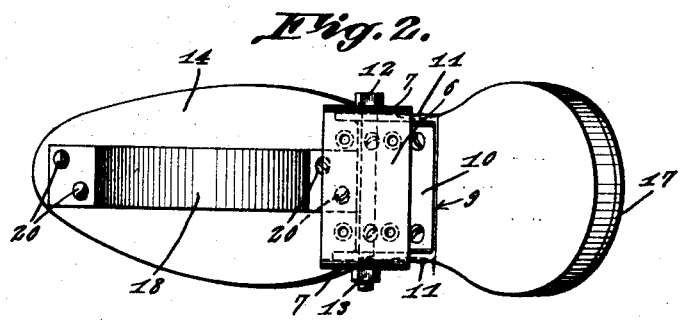
Figure 2 shows the device from beneath.
Figure 3:
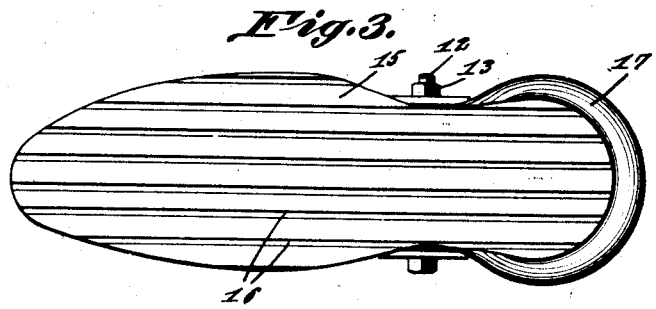
Figure 3 shows a top plan view of the pedal.

Referring now to the drawing in detail wherein like numerals of reference indicate corresponding parts throughout the several views, the numeral 1 indicates a part of the floor board of an automobile and numeral 2 the forward or inclined foot rest portion of the floor. Extending through the portion 2 of the floor is the upper terminal end of the usual accelerator rod 3 having the head 4 upon its upper end.

The device embodying this invention comprises a substantially U-shaped supporting base member indicated generally by the numeral 5. This base member comprises a flat bottom portion 6 and parallel upstanding side portions 7. These upstanding side portions 7 are each provided with an aperture upon its longitudinal center and with a surrounding circle of other apertures as indicated at 8.

Coacting with the supporting base member 5 is an inverted substantially U-shaped pedal supporting member indicated generally by the numeral 9. This pedal supporting member comprises a yoke portion 10 having the parallel downturned side members 11, each of which is provided with a single aperture upon its longitudinal center and adjacent the end thereof. The yoke 10 of the member 9 is of less length than the yoke 6 of the member 5 and the downturned portions 11 are therefore spaced closer together than are the side members 7. These downturned portions 11 are adapted to be positioned between the members 7 and when so arranged a connecting pivot bolt 12 is then passed through the aligned apertures and a retaining nut 13 threaded upon one end thereof to maintain the members 5 and 9 in pivotal relation.

Mounted upon and across the yoke 10 of the member 9 is a pedal indicated generally by the numeral 14. As is shown this pedal is mounted upon the member 9 rearwardly of the transverse center thereof or in other words at that portion which would lie beneath the instep of one's foot when placed upon the pedal. This pedal is preferably constructed of wood, because of the slowness with which wood transmits heat, although applicant does not desire to limit himself to the use of this material but he may use any material which he may find useful. The pedal is also preferably formed to conform to the outline of a foot and the top surface of the pedal has secured thereto a rubber tread 15 the surface of which is corrugated as indicated by the numeral 16 while the rear portion thereof is provided with the upstanding encircling flange 17 which is designed to receive the heel and retain the foot in proper position upon the pedal.

Extending longitudinally of the under surface of the pedal 14, and secured thereto, forwardly of the member 9, is an arcuate spring steel accelerator rod contacting member 18, the ends of which are angled as at 19 and secured to the under side of the pedal by means of the screws or other appropriate securing means 20. This resilient arcuate band or strap 18 is of sufficient length to extend nearly the entire length of the sole portion of the pedal.

From the foregoing description it will be readily seen that there has been provided an improved type of accelerator pedal, particularly in connection with the accelerator rod contacting member, which in view of its arcuate form and resilient properties, will give a better contact and enable the machine operator to maintain a better and steadier pressure upon the accelerator rod than could be maintained by using accelerator pedals of other constructions.

Having thus described my invention what I claim is:—

1. An automobile accelerator pedal of the character set forth, comprising a pedal body, means for pivotally supporting the same, and a flat resilient arcuate member extending longitudinally of the underside of said body and secured at the ends thereto and designed to have its face bear and move upon the head of an accelerator rod to actuate the same.

2. An automobile accelerator pedal comprising a foot plate, an inverted substantially U-shaped member secured to the underside thereof and having ears extending downwardly beneath the plate, an upright substantially U-shaped base of greater width than the inverted member and adapted to span the same, a pivot bolt extending through and securing the ears of the two U-members together, and in combination with, a flat arcuate member extending longitudinally of the underside of said plate to bear upon the head of an accelerator rod, and having both ends thereof secured to the plate.

In testimony whereof, I affix my signature hereto.

FREDERICK W. IVES.